(12) United States Patent
Kittelson

(10) Patent No.: US 10,257,971 B2
(45) Date of Patent: Apr. 16, 2019

(54) DRILL ATTACHMENT FOR TILLING SOIL

(71) Applicant: Rodney T. Kittelson, Glenwood, MN (US)

(72) Inventor: Rodney T. Kittelson, Glenwood, MN (US)

(*) Notice: Subject to any disclaimer, the term of this patent is extended or adjusted under 35 U.S.C. 154(b) by 133 days.

(21) Appl. No.: 15/365,913

(22) Filed: Nov. 30, 2016

(65) Prior Publication Data

US 2018/0070521 A1    Mar. 15, 2018

Related U.S. Application Data

(60) Provisional application No. 62/262,549, filed on Dec. 3, 2015.

(51) Int. Cl.
| | | |
|---|---|---|
| *A01B 1/14* | (2006.01) | |
| *A01B 1/06* | (2006.01) | |
| *A01B 1/16* | (2006.01) | |
| *A01B 33/06* | (2006.01) | |
| *A01B 33/08* | (2006.01) | |

(52) U.S. Cl.
CPC .............. *A01B 1/065* (2013.01); *A01B 33/06* (2013.01); *A01B 33/085* (2013.01)

(58) Field of Classification Search
CPC .. A01B 1/065; A01B 1/14; A01B 1/16; A01B 33/06
USPC ....... 172/15, 25, 41, 42, 375, 378, 110–112, 172/125; 15/23, 28
See application file for complete search history.

(56) References Cited

U.S. PATENT DOCUMENTS

| | | | |
|---|---|---|---|
| 1,504,852 A | | 8/1924 | Wright |
| 2,082,476 A | | 6/1937 | Allen |
| 2,492,035 A | | 12/1949 | Doble |
| 2,529,542 A | | 11/1950 | De Conti |
| 2,779,259 A | | 1/1957 | Kelsey |
| 2,917,826 A | * | 12/1959 | Pohr ................ A01G 3/062 30/347 |
| 2,991,838 A | | 7/1961 | Lane |
| 3,084,748 A | | 4/1963 | Heeren et al. |
| 3,129,771 A | | 4/1964 | Lidstone |
| 3,136,372 A | | 6/1964 | Roach |
| 3,356,168 A | | 12/1967 | Johnson |
| 3,554,293 A | | 1/1971 | Aman et al. |
| 4,213,504 A | | 7/1980 | Schneider |
| 4,618,003 A | | 10/1986 | Hostetter |
| 4,819,736 A | | 4/1989 | Hedgepeth |
| 4,901,800 A | | 2/1990 | Wilson |

(Continued)

*Primary Examiner* — Tara Mayo-Pinnock
(74) *Attorney, Agent, or Firm* — Albert W. Watkins

(57) ABSTRACT

A drill attachment for tilling soil has an extended drill shaft that is coupled with a till plate. The combination may be driven by an ordinary hand drill. The drill shaft has a stabilizer tip that protrudes beyond the till plate. The till plate includes a plurality of teeth that dig into and work top soil, while a generally planar disk-shaped body member at the top of the till plate prevents the till plate from sinking below the surface of the soil. The teeth are stamped from the till plate, forming openings in the generally planar disk-shaped body member. These openings and other optional openings cooperate with the teeth to further break up clumps of soil, and help to balance forces from the teeth pulling into the soil against the force of the body member that resists sinking into the earth. Optional weed-out and hole tools are also disclosed.

15 Claims, 6 Drawing Sheets

(56) References Cited

U.S. PATENT DOCUMENTS

| | | | |
|---|---|---|---|
| 4,905,768 A | 3/1990 | Lorenz | |
| 4,986,368 A | 1/1991 | Underwood et al. | |
| 5,056,605 A | 10/1991 | Bond et al. | |
| 5,133,269 A | 7/1992 | Charneski | |
| 5,441,118 A | 8/1995 | Cruz, Jr. | |
| 5,564,353 A | 10/1996 | Wade et al. | |
| 5,810,093 A | 9/1998 | Howard | |
| 5,862,658 A | 1/1999 | Howard | |
| 5,875,700 A * | 3/1999 | Powell | A01D 34/73 30/276 |
| 5,909,778 A | 6/1999 | Acosta et al. | |
| 5,988,292 A | 11/1999 | Knotts | |
| 6,032,442 A | 3/2000 | Paolo | |
| 6,050,344 A | 4/2000 | Larson et al. | |
| 6,073,702 A * | 6/2000 | Petruzzelli | A01C 5/02 172/373 |
| 6,125,776 A | 10/2000 | Carmichael | |
| 6,189,627 B1 | 2/2001 | Marshall et al. | |
| 6,227,317 B1 | 5/2001 | Severns | |
| 6,352,122 B1 | 3/2002 | Love | |
| 6,536,535 B1 | 3/2003 | Washek | |
| 6,595,298 B1 | 7/2003 | Crady | |
| 6,615,928 B2 | 9/2003 | Dueitt | |
| 6,722,444 B2 | 4/2004 | McKill | |
| 6,736,217 B2 | 5/2004 | Brown | |
| 6,761,227 B1 | 7/2004 | Messer | |
| 6,854,524 B1 | 2/2005 | Williams | |
| 6,955,227 B1 | 10/2005 | Motosko | |
| D518,491 S * | 4/2006 | Vaughn | D15/28 |
| 7,258,178 B2 | 8/2007 | Gordon | |
| 7,748,470 B2 | 7/2010 | Ortiz | |
| D663,323 S | 7/2012 | Ortiz | |
| D742,929 S | 11/2015 | Ortiz | |
| D749,140 S | 2/2016 | Ortiz | |
| 2004/0188108 A1 * | 9/2004 | Thompson, Sr. | A01B 1/065 172/25 |
| 2005/0082069 A1 * | 4/2005 | Bodeker | A01B 1/065 172/13 |
| 2007/0062713 A1 | 3/2007 | Szurpicki | |
| 2008/0011497 A1 | 1/2008 | Catlin | |
| 2008/0011498 A1 | 1/2008 | Catlin | |
| 2008/0217035 A1 | 9/2008 | Ortiz | |

\* cited by examiner

DRILL ATTACHMENT FOR TILLING SOIL

CROSS REFERENCE TO RELATED APPLICATIONS

The present application claims the benefit of U.S. provisional patent application 62/262,549 filed Dec. 3, 2015 of like title and inventorship, the teachings and entire contents which are incorporated herein by reference.

BACKGROUND OF THE INVENTION

1. Field of the Invention

The present invention relates generally to the field of earth working, and more particularly to tools rotary driven about a generally vertical axis. In one manifestation, the invention is a power drill tool including accessories operative to loosen soil, incorporate fertilizer into soil, and remove weeds therefrom.

2. Description of the Related Art

Prior to planting, the topsoil needs loosened. Subsequent to planting, loosening the topsoil between plants not only benefits the plants, but also removes weeds that could otherwise compete with the plants. In addition, both prior and subsequent to planting, it may be desirable to mix fertilizer into the soil. While tilling to loosen the soil can be done manually, powered tillers can ease the time and effort required. Many sizes and varieties of powered tillers exist, and most are well suited to different terrains and surface areas. Regardless, most powered tillers tend to be more costly, and also require more space for storage when not in use. Furthermore, tillers are generally not desirable for mixing in fertilizer, due to difficulty to control the depth that the fertilizer may be mixed to.

In contrast to power tillers, manual tools are much less expensive and require much less storage space. Exemplary U.S. patents, the teachings which are incorporated herein by reference, include: U.S. Pat. No. 2,492,035 by Doble, entitled "Weed puller"; U.S. Pat. No. 4,618,003 by Hostetter, entitled "Weeder-cultivator"; U.S. Pat. No. 4,905,768 by Lorenz, entitled "Manual agricultural implement"; and U.S. Pat. No. 5,441,118 by Cruz, entitled "Weed twister". These tools can work quite well in good soil, and where only one or a few weeds are to be removed or a small area is to be treated with fertilizer. Unfortunately, manual tools also require much more labor to operate. Consequently, where there is a large area to be worked, or where there are many weeds to be removed, this approach can be unduly burdensome. Also undesirably, in more difficult soils, such as clay, rocky, or heavy soils, these manual tools tend to be far less effective and require greater labor. Most commonly, hand tools will only marginally penetrate and break up more difficult soils. As a result, while surface soil and weed tops may be disturbed, the underlying soil and weed roots remain unaffected, allowing weeds to regrow quickly.

A smaller and less expensive option taught by at least some artisans has been to create drill accessories to assist with earth working. Auger and drill bits, many which are designed to work with conventional drills and other rotary drivers are known that are designed with the intention of loosening soil for holes, removing weeds, and tilling a garden. Exemplary U.S. patents, the teachings which are incorporated herein by reference, include: U.S. Pat. No. 1,504,852 by Wright, entitled "Rotary drill bit"; U.S. Pat. No. 2,779,259 by Kelsey, entitled "Soil stirring device"; U.S. Pat. No. 3,136,372 by Roach, entitled "Crusher for wild onions and the like"; U.S. Pat. No. 3,356,168 by Johnson, entitled "Garden and lawn auger"; U.S. Pat. No. 4,819,736 by Hedgepeth, entitled "Weed removal tool"; U.S. Pat. No. 4,901,800 by Wilson, entitled "Cultivator tool for planting seedlings"; U.S. Pat. No. 4,986,368 by Underwood et al, entitled "Planting apparatus"; U.S. Pat. No. 5,133,269 by Charneski, entitled "Plant hole digger with cylindrical cutter"; U.S. Pat. No. 5,564,353 by Wade et al, entitled "Method for forming a planting hole in soil while leaving a substantial portion of pulverized soil in the hole"; U.S. Pat. No. 5,862,658 by Howard, entitled "Grass remover for termite bait station"; U.S. Pat. No. 6,227,317 by Severns, entitled "Garden auger having wings and cutters"; U.S. Pat. No. 6,761,227 by Messer, entitled "Drill bit for aerating soil for a plant with root system"; U.S. Pat. No. 6,955,227 by Motosko, entitled "Auger for mixing and burrowing"; and U.S. Pat. No. 7,258,178 by Gordon, entitled "Auger planter". As may be apparent, these tools provide much flexibility to a gardener or grounds keeper, by enabling them to quickly turn soil in small areas or tight spaces, without having to expend major effort. Instead, the drill or other rotary tool may be allowed to do the work.

However, it is advantageous to limit the soil being turned over to just topsoil, preserving the moisture deeper down. Furthermore, in the case of fertilizer application, it is desirable to keep the fertilizer near to the surface. The auger bits have no method beyond manual control to attempt such precision. Consequently, a tool operator must exert significant force trying to control the depth of the tool. In addition, when a rock or other foreign obstacle is encountered, the tool may jump or bounce relatively uncontrollably. This can in some instances present a safety hazard, particularly where a relatively smaller or more frail individual is trying to operate the tool. Furthermore, it is very desirable to efficiently break up the soil, and auger bits will tend to throw or displace chunks of soil, without breaking up the soil or adequately disrupting weed roots. Consequently, and while these drill accessories have undoubtedly proved to be beneficial to many gardeners, an improved accessory is very much desired to better meet the needs of all gardeners.

Other artisans have provided tools that are operative through only a small and generally more easily controlled depth than that of the augers and soil drills. These tools are formed from folded and bent wire, and in some cases in further combination with other features. Exemplary U.S. patents and published applications, the teachings which are incorporated herein by reference, include: U.S. Pat. No. 2,991,838 by Lane, entitled "Earth borer, pulverizer, and trenching device"; U.S. Pat. No. 3,084,748 by Heeren et al, entitled "Tined mulcher head"; U.S. Pat. No. 3,129,771 by Lidstone, entitled "Cultivating tool"; U.S. Pat. No. 4,213,504 by Schneider, entitled "Rotary, hand-held apparatus for performing various soil working operations"; U.S. Pat. No. 5,909,778 by Acosta et al, entitled "Hand-held soil tilling system"; U.S. Pat. No. 5,988,292 by Knotts, entitled "Ground tilling device"; U.S. Pat. No. 6,050,344 by Larson et al, entitled "Rotary garden tool"; U.S. Pat. No. 6,189,627 by Marshall et al, entitled "Lawn and garden tool"; U.S. Pat. No. 6,536,535 by Washek, entitled "Garden tool"; U.S. Pat. No. 6,722,444 by McKill, entitled "Rotary hand-held tilling and weed removing device"; U.S. Pat. No. 6,736,217 by Brown, entitled "Weed, weed root and root vine removing, cultivating tool"; U.S. Pat. No. 7,748,470 by Ortiz, entitled "Combination garden tiller and sprinkler head grass trimmer"; Des 663,323 by Ortiz, entitled "Tiller head"; Des 742,929 by Ortiz, entitled "Tiller head"; Des 749,140 by Ortiz, entitled "Tiller head"; 2008/0011497 by Catlin, entitled "Power drill cultivator attachment"; 2008/0011498 by Catlin, entitled "Cultivator and blade"; and 2008/0217035 by Ortiz, entitled "Combination garden tiller and sprinkler head grass trimmer". While these tools are generally easier to control depth than with the augers and soil drills, they still require the operator to lift against the weight of the tool and rotary drill in order to not penetrate too deeply into the soil. Further, these tools are generally significantly more expensive to produce, owing to the relatively large number of forming operations and welds required. In most cases, each tine must be individually bent, and the supporting framework or collection of bent tines will then need held in position and welded together to form a complete tool. As may be apparent, this will require significant cost either in either labor required for handling and operations, or in the extreme equipment required to automate the inherently complex production.

A more limited set of artisans have designed rotary tools that offer improved depth control over the wire tools, augers, and soil drills described herein above. Exemplary U.S. patents, the teachings which are incorporated herein by reference, include: U.S. Pat. No. 3,554,293 by Aman et al, entitled "Rotary weeding and edging attachment for rotary power source"; U.S. Pat. No. 5,810,093 by Howard, entitled "Multi-purpose landscaping device for use with a hand-held rotary power tool"; U.S. Pat. No. 6,125,776 by Carmichael, entitled "Device for digging planting holes for bedding plants and the like"; U.S. Pat. No. 6,352,122 by Love, entitled "Tool for planting flower bulbs and ornamentals"; U.S. Pat. No. 6,595,298 by Crady, entitled "Multi-purpose weeder with auger"; U.S. Pat. No. 6,615,928 by Dueitt, entitled "Powered garden tool"; and U.S. Pat. No. 6,854,524 by Williams, entitled "Tools and methods to trim excess vegetation from growing plants". Unfortunately, and as with the wire tools described herein above, these tools require substantial time, labor, and tooling for production and assembly of the many components.

A select few artisans have attempted to address depth control, while simultaneously reducing the burden on the operator to keep the tool at an appropriate depth. Exemplary U.S. patents and published applications, the teachings which are incorporated herein by reference, include: U.S. Pat. No. 2,082,476 by Allen, entitled "Garden tool"; U.S. Pat. No. 2,529,542 by De Conti, entitled "Hand cultivator and weeder"; and U.S. Pat. No. 5,056,605 by Bond et al, entitled "Multipurpose cutting means". In addition, these tools are fabricated from unitary formed sheet metal cutting or cultivator heads, substantially reducing the labor and difficulty of fabrication. The primary surface area of the cultivator head is parallel to the surface of the ground, and as a result the head will not readily penetrate into the soil. Instead, the plate is designed to run along the soil surface, with the tines penetrating into the soil. This makes the operation of these tools much more practical for the smaller or more frail users.

However, and in spite of the easier fabrication and use, these tools have not gained widespread acceptance, and instead have been replaced by tools of other types described herein above. One particularly vexing problem with these tools is the accumulation of clumps of soil and other debris that may collect beneath the plate. As the debris accumulates, the plate is lifted above the surface of the ground. This in turn defeats the intended depth control, and instead the tool rises off of the soil surface and becomes ineffective. The fact that this will occur in essentially all soil types is particularly noteworthy.

Another undesirable characteristic of these tools is the fact that the cutting or cultivating tines are formed solely around the perimeter of the depth plate, meaning that the operator must move the tool about somewhat blindly, since the plate blocks visibility of the underlying soil, with the hope and expectation that all of the soil will be adequately worked. In addition, while De Conti uses the metal well, fabrication of the Bond et al cutting means wastes a significant amount of metal during a stamping operation. Further, the Bond et al design requires either multiple stampings or significant forming to bend the teeth as illustrated. Likewise, the Allen design wastes more metal from a stamping that is used in the tool, once again adding to the cost of fabrication.

An additional patent of less relevance, the relevant teachings and contents which are incorporated herein by reference, is U.S. Pat. No. 6,032,442 by Paolo, entitled "Landscaping trimmer attachment".

As may be apparent, in spite of the enormous advancements and substantial research and development that has been conducted, there still remains a need for an improved drill-attached tool for working soil.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a drill attachment for tilling soil comprises a shaft and a till plate. The shaft defines a longitudinal axis of rotation. The shaft longitudinally terminates at a first end at a shank adapted to operatively couple to a rotary power source and at a second end distal to said first end at a stabilizer tip. The till plate is rigidly affixed to the drill shaft. The till plate has: a generally planar body member defining a first major surface configured to face the soil and a second major surface distal thereto; at least one perforation open and extending entirely from the generally planar body member first major surface to the generally planar body member second major surface; and at least one tooth protruding from the generally planar body member first major surface more distal from the shank than the generally planar body member. The at least one tooth is configured to operatively extend into the soil.

In a second manifestation, the invention is a till plate. A generally planar body member defines a first major surface configured to face the soil. At least one perforation is open and extends entirely through the generally planar body member. At least one tooth protrudes from the generally planar body member first major surface.

In a third manifestation, the invention is a weed out tool having a generally planar body. A pair of teeth depend from opposed ends of the generally planar body and spread apart from each other with increasing distance from said body. Each one of the pair of teeth terminate in a tip, and each tip decreases in distance from each other with increasing distance from said body.

OBJECTS OF THE INVENTION

Exemplary embodiments of the present invention solve inadequacies of the prior art by providing a drill shaft with a till plate, the combination that may be coupled with an ordinary hand drill or other rotary drive source. The drill shaft has a stabilizer tip that protrudes beyond the till plate. The till plate includes a plurality of teeth that are operative to dig into and work top soil, while a generally planar disk-shaped body member at the top of the till plate helps to break up soil and debris, and resists sinking below the surface of the soil. Optional weed-out and hole tools are also provided, to broaden the applications for the present invention.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a powered tool that can quickly and efficiently work the soil and that requires minimal labor to operate. A second object of the invention is to provide such a tool that is economical to produce, requires minimal storage space, is suited to different terrains and surface areas, and will function well in diverse and difficult soils. Another object of the present invention is in at least one embodiment is to provide such a tool with intrinsic depth control that may loosen topsoil, remove weeds that could otherwise compete with desired plants, facilitate fertilizer application, and limit the soil being turned over to just topsoil, preserving deeper soil moisture. A further object of the invention in at least one embodiment is to provide a primary surface area of a cultivator head parallel to the surface of the ground, and as a result ensure that the head will not readily penetrate into the soil, while also through the design of the cultivator head simultaneously preventing or reducing the likelihood for accumulation of clumps of soil and other debris beneath the plate. Yet another object of the present invention in at least one embodiment is to provide cultivating tines throughout the depth plate, to thereby improve the working of all soil underneath and adjacent to the plate. An additional object of the invention in at least one embodiment is the provision of a stable tool relatively resistant to unsafe bouncing off of rocks and or other foreign obstacles. A further object of the invention is the provision of a tool fabricated from a unitary formed sheet metal cutting or cultivator head, substantially reducing the labor and difficulty of fabrication. Another object of the invention is to preserve metal during fabrication, thereby reducing the amount of waste or scrap resulting from production. An additional object of the invention is to form a cultivator head through a single stamping operation.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
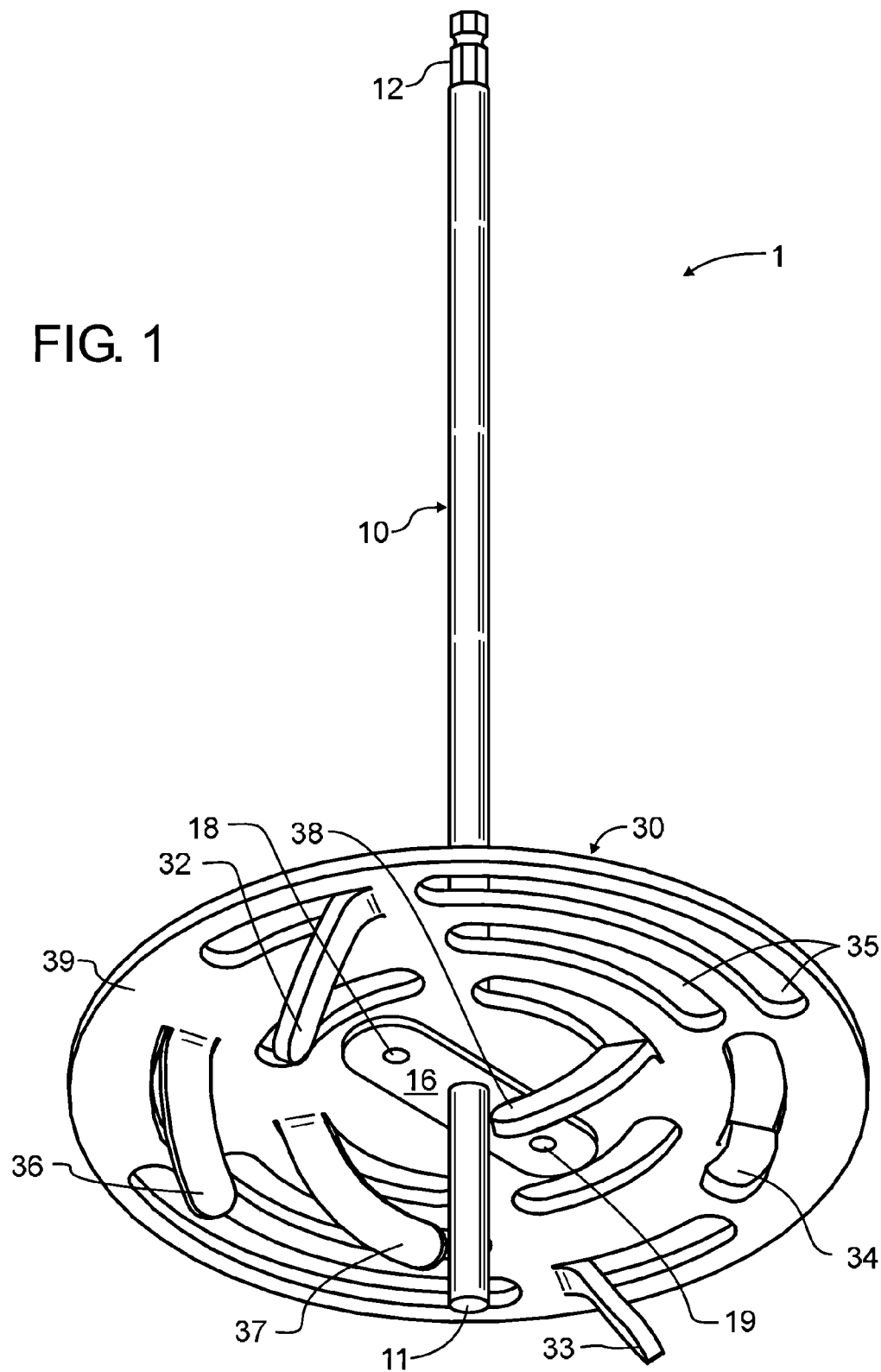
FIG. 1 illustrates a preferred embodiment drill attachment for tilling soil designed in accord with the teachings of the present invention from a slightly projected and elevational view.
Figure 3:
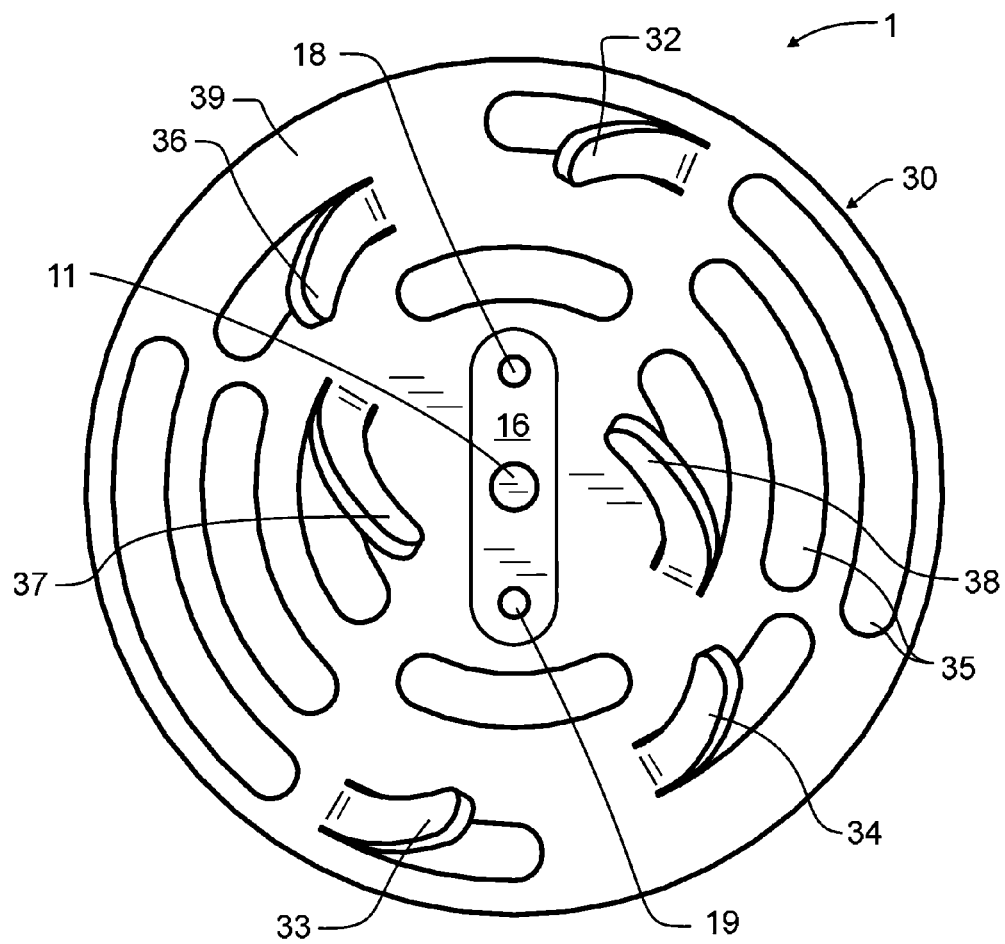
FIG. 3 illustrates the preferred embodiment drill attachment for tilling soil of FIG. 1 from a bottom view.

Manifested in the preferred embodiment, the present invention provides a drill attachment for tilling soil 1 that can quickly and efficiently work the soil and that requires minimal labor to operate. In a preferred embodiment of the invention illustrated in FIGS. 1 and 3, drill attachment for tilling soil 1 is comprised of a drill shaft 10 and a till plate 30. Drill shaft 10 preferably extends beyond till plate 30 to define a stabilizer tip 11, thereby resisting sudden transverse movements of drill attachment 1 when in use. In addition, stabilizer tip 11 serves as a pilot or guide, helping to accurately position till plate 30 when working in close spaces. The length of stabilizer tip 11 is not critical to present invention, and so will be varied by a designer in light of the teachings described herein. Nevertheless, for exemplary purposes only and not limiting the present invention solely thereto, stabilizer tip 11 may be several inches in length.

Figure 2:
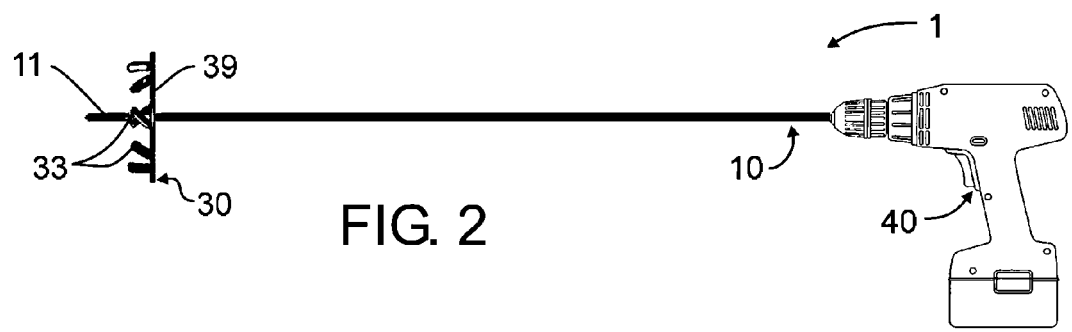
FIG. 2 illustrates the preferred embodiment drill attachment for tilling soil of FIG. 1 from a side view, and in further combination with an exemplary cordless drill.

A plurality of teeth 32-34 and 36-38 preferably protrude from the generally planar body member 39 of till plate 30, as particularly well illustrated in FIG. 2. During operation, these teeth are configured to extend down into the soil below till plate 30. The particular number and length of teeth is not critical to present invention, and so will be varied by a designer in light of the teachings described herein. Nevertheless, for exemplary purposes only and not limiting the present invention solely thereto, there are illustrated six teeth 32-34 and 36-38. Moreover, one or more of these teeth 32-34 and 36-38 may be angularly offset from either parallel to the plane of till plate 30 or the longitudinal axis of stabilizer tip 11. In the preferred embodiment, each of the six teeth are angled approximately midway or intermediate there between, or at approximately a 45 degree angle from either the plane of till plate 30 or the longitudinal axis of stabilizer tip 11. However, in an alternative embodiment contemplated herein and described for exemplary purposes, some of the teeth 32-34 and 36-38 might be angled, while other teeth 32-34 and 36-38 might extend perpendicular to the plane of till plate 30 and parallel to the longitudinal axis of stabilizer tip 11. Furthermore, individual teeth 32-34 and 36-38 may terminate at greater or lesser distances from till plate 30. As may be understood then, the particular number of teeth, and the length and angular orientation of each tooth 32-34 and 36-38 may be individually varied to meet a particular need or desire of the designer.

FIG. 2 illustrates preferred embodiment drill attachment for tilling soil 1 in further combination with a cordless drill 40. The particular drill type, power source, and geometry are not critical to the present invention. Instead, drill 40 is preferably a source of rotary motive power which is used to turn drill shaft 10 and thereby rotate till plate 30 and teeth 32-34 and 36-38. Drill shaft 10 may optionally provided with a shank 12 that in the preferred embodiment is a hex shank that will readily be secured by the chuck of drill 40. In various alternative embodiments, for exemplary purposes only and not solely limiting the invention thereto, other shanks may be provided, such as a straight shank or a triangular shank. As may be apparent then, preferred embodiment drill attachment 1 has the benefit of being of a small size comparable to most hand-powered earth working tools, while being readily attached to and detached from a common cordless or corded drill that many persons already own and store.

Figure 4:
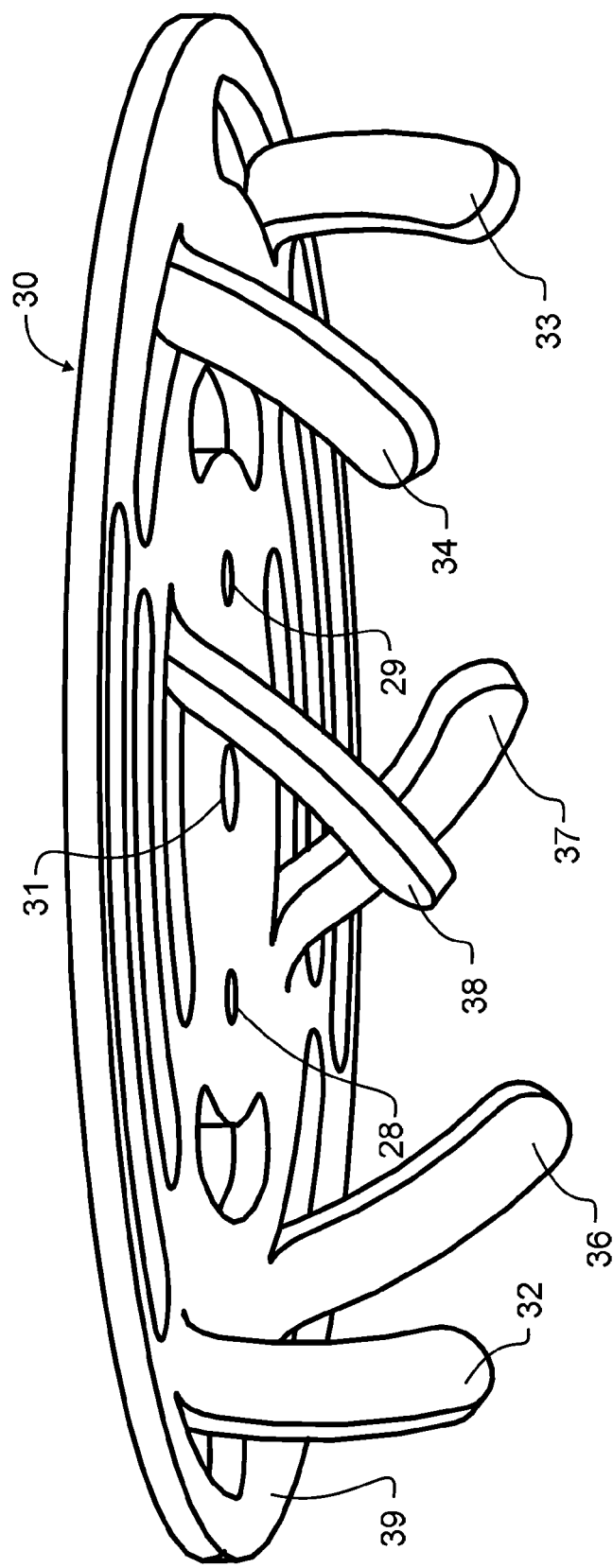
FIGS. 4 and 5 illustrate the preferred embodiment till plate used in the preferred embodiment drill attachment for tilling soil of FIG. 1, from a side and slight bottom projected view, and a top view, respectively.
Figure 5:
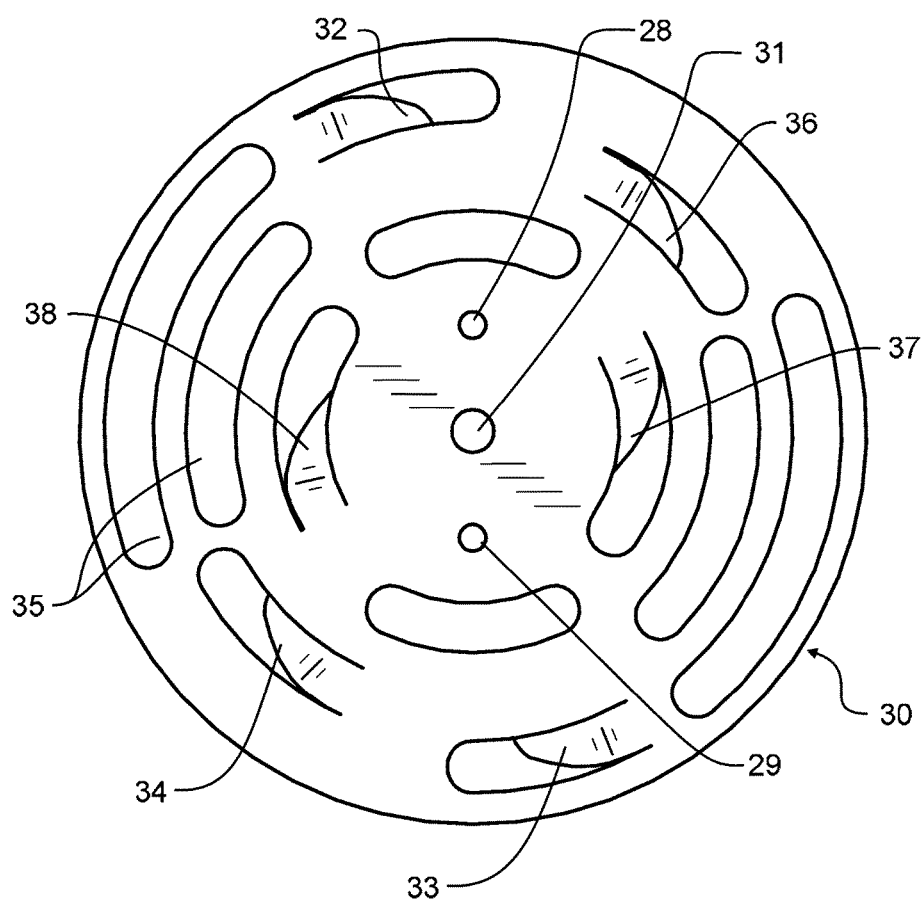

FIGS. 4-5 illustrate the preferred embodiment till plate 30 used in the preferred embodiment drill attachment for tilling soil 1 from a primarily side view and a top view, respectively. As described herein above, till plate 30 includes generally planar body member 39 having a centering hole 31, a pair of coupling holes 28, 29, at least one and preferably a plurality of teeth 32-34 and 36-38, and at least one and preferably a plurality of openings 35. While not as readily apparent in FIGS. 1-4, FIG. 5 also more clearly illustrates an additional optional but preferred feature of the present invention. As visible in FIG. 5, each of the plurality of teeth 32-34 and 36-38 are not only bent or folded at an angle downward out of the plane of generally planar body member 39, these teeth 32-34 and 36-38 are also spiraled or twisted slightly along their length to also gently face more radially outward. In the event a hard object such as a stone is encountered by one or more of teeth 32-34 and 36-38, these teeth 32-34 and 36-38 will gently urge or drive the stone away from underneath generally planar body member 39. In addition, other matter that might tend to wrap and hold around a tooth will be gently urged radially outward, helping to keep each tooth free of entangling debris. Nevertheless, in an alternative embodiment teeth 32-34 and 36-38 may instead be simply bent straight down, without the gentle twist incorporated into the preferred embodiment.

In a most preferred method of fabrication, preferred embodiment till plate 30 is of unitary construction, and may be fabricated from standard sheet stock such as by stamping using suitable dies, substantially reducing the labor and difficulty of fabrication. The stamping operation will typically define the outer shape or perimeter thereof, and may simultaneously or in prior or subsequent stamping or forming operations define openings 35 and teeth 32-34 and 36-38. This means that a single forming operation or sequence, in the preferred embodiment a stamping operation, can form till plate 30. In addition, and particularly in stark contrast to the Allen and Bond et al references incorporated by reference herein above, there is substantial preservation of metal during fabrication. This is because teeth 32-34 and 36-38 are formed within the interior of the perimeter of generally planar body member 39 and are comprised by matter displaced from the plane of generally planar body member. The only material that is unused from the stamping is the material that is outside the perimeter of body member 39, the material that defines openings 35 and centering hole 31, and the material that defines the holes through which fasteners 18 and 19 pass. Consequently, till plate 30 is very economical to produce with only very minimal labor required.

While in an alternative embodiment contemplated herein, generally planar body member 39 may be fabricated to be rectangular, and would thereby preserve more material during fabrication, the sharp corners that would be present on the exterior perimeter of the base would be a hazard during use. Corners on the perimeter of body member 39 could easily injure a person, an adjacent plant, or other objects that the base may impact. Furthermore, such corners would also undesirably propel dirt, rocks, and other matter. This can be particularly vexing when an alternative embodiment drill attachment for tilling soil 1 is unintentionally tilted slightly away from vertical during operation. In contrast, preferred embodiment till plate 30 is fabricated from a disk-shaped body member 39, which means that if a person or plant is accidently contacted by till plate 30 from the side ro edge of disk-shaped body member 39, the smooth circular perimeter will simply slide on and either harmlessly bounce off or gently rub against the contacted object. No objects are dangerously impacted or propelled therefrom.

Figure 6:
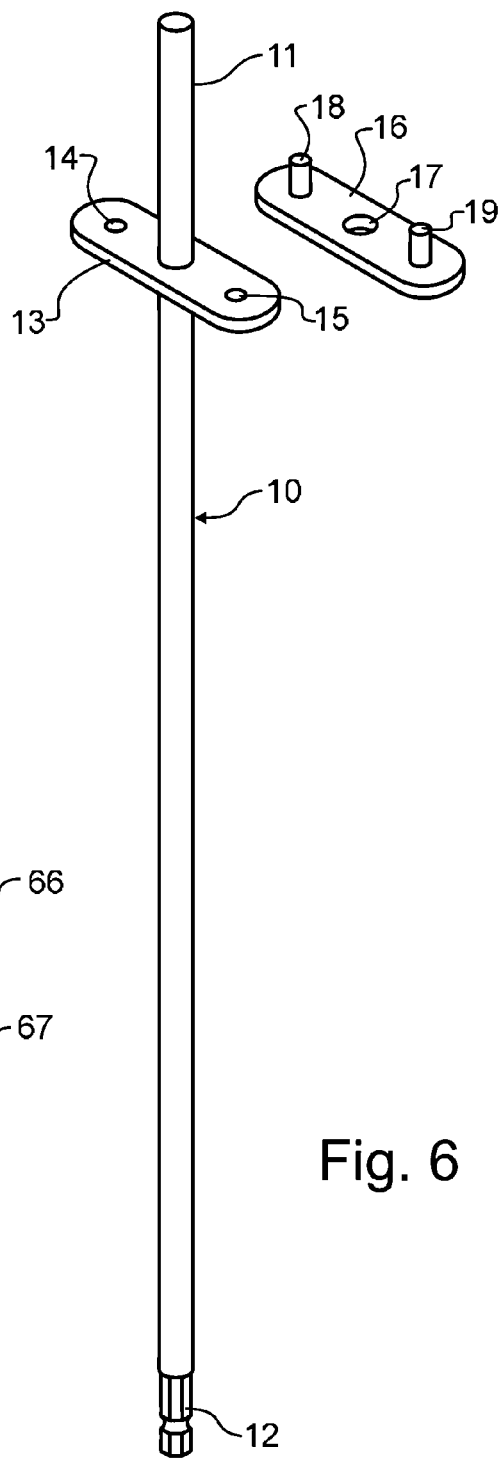
FIG. 6 illustrates the preferred embodiment drill shaft and coupling used in the preferred embodiment drill attachment for tilling soil of FIG. 1 from a slightly projected elevational view.

FIG. 6 illustrates the preferred embodiment drill shaft 10 and coupling plates 13, 16 used in the preferred embodiment drill attachment for tilling soil 1. As will be appreciated, and as with the other components described herein, the particular length and diameter of drill shaft 10 is not critical to the present invention. However, most household drills have a chuck that has a maximum capacity of either ¼" or ⅜". Consequently, shank 12 will preferably fit in either or both of these standard household chuck sizes.

Furthermore, drill shaft 10 as illustrated is a single unitary component to which coupling plate 13 has been affixed, by a suitable technique such as but not limited to welding or brazing. However, in an alternative embodiment contemplated herein, drill shaft 10 may be fabricated in multiple sections that are coupled together, such as through the provision of one or more extension shafts. The configuration of a drill extension shaft, and the various couplers that may be provided therewith, are well known in the mechanical art of drill accessories, and so will be understood to be incorporated herein. Dividing drill shaft 10 into more than one section facilitates packaging, store display, shipping, and storage. In addition, more than one section permits the overall length of drill shaft 10 to be better matched to the height of a tool operator.

Coupling plates 13, 16 are optional, and provide for the removal and replacement of till plate 30 with either a new till plate or with other accessories such as are described herein below. However, in an alternative embodiment, till plate 30 may be rigidly affixed to shaft 10, such as by welding or brazing.

To effect coupling, till plate 30 or other accessory will be aligned with stabilizer tip 11. In the case of till plate 30, centering hole 31 is provided to circumscribe stabilizer tip 11. Next, till plate 30 will be slid onto stabilizer tip 11 toward shank 12, coming to a stop at coupler 13. Next, coupling plate 16 will be slid onto stabilizer tip 11 using centering hole 17 and slid toward shank 12, coming to a stop at till plate 30. Holes 14, 15 are then aligned with corresponding coupling holes 28, 29 in till plate 30 and with fasteners 18, 19, and then fasteners 18, 19 are used to secure coupler 16 and till plate 30 to coupler 13.

Preferred embodiment drill attachment 1 may readily be manufactured in only a few relatively low cost and reliable steps. Standard rod stock may be cut to the length of drill shaft 10, including stabilizer tip 11. If desired, a hexagonal or other geometry shank 12 may be formed on the end of drill shaft 10, such as by swaging, machining, grinding, or other suitable technique. Till plate 30, and, if used, coupling plates 13, 16 are stamped. Finally drill shaft 10 and either coupling plate 13 or till plate 30 will be affixed together, such as by welding, brazing, or any other suitable technique appropriate for the particular materials used in the construction of preferred embodiment drill attachment 1. As already noted, by using coupling plates 13, 16, other accessories beyond till plate 30 may optionally be provided, as described herein below.

Figure 7:
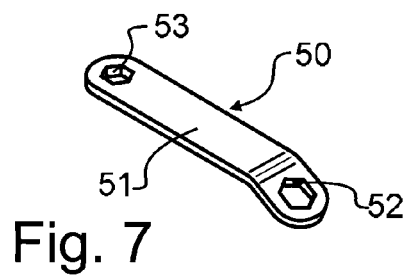
FIG. 7 illustrates a preferred embodiment coupling tool from a projected view.

Wrench 50 illustrated in FIG. 7 may also preferably stamped from sheet stock to form body member 51. Wrench 50 is provided with one or more wrench openings 52, 53 designed to engage with a fastener head. Consequently, wrench 50 facilitates the turning and tightening of fasteners 18, 19. While opening 52 is angularly offset from the plane of body 51 and wrench opening 53 is co-planar with body 51, there is no requirement that either be angularly offset or coplanar, and they can be either. So, for exemplary purposes only and not solely limiting the invention thereto, either one or both of wrench openings 52, 53 may be angularly offset, and if so desired these two openings may also be in planes parallel with each other, thereby forming a gentle bend resembling the letter "z". With nearly any angle between body 51 and the two co-planar wrench openings 52, 53. Alternatively, these two openings may instead form a square bottomed "U", with both of wrench openings 52, 53 extending either in parallel or non-parallel planes in the same direction from body 51. As may be apparent, the geometry of wrench 50 is not critical to the present invention. In the preferred embodiment drill attachment for tilling soil 1, other types of fasteners besides rotary driven fasteners may be used, in which case wrench 50 will be extraneous and not provided.

In operation, the weight of drill 40 and preferred embodiment drill attachment 1 will each assist in causing teeth 32-34 and 36-38 to penetrate into the soil. Further, the angular orientation of teeth 32-34 and 36-38 will cause the teeth to dig into the top soil, tending to pull preferred embodiment drill attachment 1 deeper into the soil while simultaneously lifting and breaking up the soil and removing weeds that could otherwise compete with the plants. Generally planar body member 39 generates a countering force when it engages with the top soil, and so helps to prevent drill attachment 1 from digging undesirably deep into earth 50. Consequently, the size of generally planar body member 39 and the proportion of openings therein will preferably be configured to generate approximately equal and opposed forces to those generated by teeth 32-34 and 36-38, that are in turn determined by the size and angular orientation of the teeth. While an exact balance of forces may not be possible, since this will also depend upon soil characteristics, the weight of drill 40, and the speed of rotation, till plate 30 will preferably have sufficient solid surface area to not dig uncontrollably into soil, and instead to suspend drill 40 and preferred embodiment drill attachment 1 while spinning adjacent the soil surface. When the forces are perfectly balanced, preferred embodiment drill attachment for tilling soil 1 will thereby be configured to have intrinsic depth control. Preferred embodiment drill attachment for tilling soil 1 is thereby configured to quickly and efficiently turn and break up soil, mix in fertilizer, and remove weeds without an operator having to expend undue effort either lifting or pushing down on drill 40, and instead, ensures that a drill or other rotary tool does the work with the operator only having to apply small compensating forces.

As will be appreciated, and presuming generally planar body member 39 is spinning approximately adjacent to the soil surface, the distance between the terminations of teeth 32-34 and 36-38 and generally planar body member 39, such as would be measured in the illustration of FIG. 2, will help to determine approximately how deep the soil will be tilled. For exemplary purposes only, and not solely limiting the present invention thereto, in preferred embodiment drill attachment 1, teeth 32-34 and 36-38 terminate approximately one inch from till plate 30, and so preferred embodiment drill attachment 1 will only till approximately one inch deep into the topsoil of earth 50. This limited depth helps to preserve the moisture in the deeper soil.

By providing a sufficient plurality of teeth 32-34 and 36-38 and arranging these teeth at different radial distances from shaft 10 and stabilizer tip 11, the entire area of soil adjacent to generally planar body member 39 will be worked. Furthermore, by arranging the teeth in pairs that are opposed about shaft 10 and centering hole 31, and equidistant therefrom, the forces generated during rotation will remain generally balanced about shaft 10. In preferred embodiment drill attachment 1, teeth 37 and 38 form a first pair equidistant and opposed about stabilizer tip 11. Radially farther from stabilizer tip 11 than teeth 37 and 38 are a second pair of opposed and equidistant teeth 34, 36. For the purposes of the present disclosure then, the first pair of teeth 37, 38 will be understood to be radially offset from teeth 34, 36, owing to the different radial distances between the two pairs from stabilizer tip 11.

The openings 35 formed into till plate 30 reduce the weight of preferred embodiment drill attachment 1, help to mix fertilizer into the soil, and also help to break up the soil and weeds during rotation. These openings 35 and the radially distributed teeth 32-34 and 36-38 thereby help to prevent or reduce the likelihood for accumulation of clumps of soil and other debris that may collect beneath the plate, by assisting in the grinding, crumbling, and destruction thereof.

In operation, a person will hold drill 40 against rotation, so that drill shaft 10 will rotate relative to the earth and thereby rotate till plate 30, teeth 32-34 and 36-38, and openings 35. Drill shaft 10 will most commonly be held in a generally vertical orientation by the operator, and stabilizer tip 11 will penetrate to a greater depth than teeth 32-34 and 36-38. In the event teeth 32-34 and 36-38 encounter a rock or particularly hard soil, stabilizer tip 11 will then stabilize till plate 30, helping to control the movement of till plate 30 and teeth 32-34 and 36-38. In the event stabilizer tip 11 encounters a rock or other obstacle that is not readily bypassed, the operator will only need to lift preferred embodiment drill attachment 1 a few inches to raise stabilizer tip 11 completely out of the soil, and then lower preferred embodiment drill attachment 1 back into the soil at an adjacent location clear of the rock or obstacle. As noted herein above, the combination of till plate 30 and angular teeth 32-34 and 36-38 will create a pull to the proper depth in the soil. The operator will only need to expend energy guiding preferred embodiment drill attachment 1 about and preventing drill rotation, while requiring much less effort than the prior art to lift up or push down to control depth.

While the present invention is not to be limited by sizing and particular dimension, several important considerations must be evaluated in determining particular dimensions. First, drill shaft 10 must have sufficient cross-section and geometry to withstand the torque applied in tilling the soil. As will be appreciated by those familiar with mechanical engineering and design, the particular diameter of drill shaft 10 will be dependent not only upon the horsepower rating for drill 40, but also the capability of an operator, and also the size and dimension of drill shaft 10, till plate 30, and teeth 32-34 and 36-38. Consequently, one or more of drill shaft 10, till plate 30, and teeth 32-34 and 36-38 may be adjusted or varied to meet the capabilities of a particular drill type or power rating and a particular operator.

In addition, drill shaft 10 must have a small enough diameter to be used in combination with an intended drill chuck. The drill shaft 10 will also most preferably be long to enable an average user to employ preferred embodiment drill attachment 1 without undue stress upon the back muscles, while also not being so long as to prevent a smaller user from operating preferred embodiment drill attachment 1, and also not so long as to require undue diameter to the drill shaft 10 to handle the increased length and associated flexure. As described herein above, and where desired, drill shaft 10 may be provided with one or more extension shafts for more compact packaging, shipping, and storage, while also permitting comfortable use by persons for more diverse size. A preferred length for drill shaft 10 locates preferred embodiment drill attachment 1 near or slightly above waist height for a typical person. Moreover, the diameter of the till plate 30 is ideally optimized to turn over as much soil as possible while working within the limitations of the strength of drill shaft 10, drill 40, and the operator.

Figure 8:
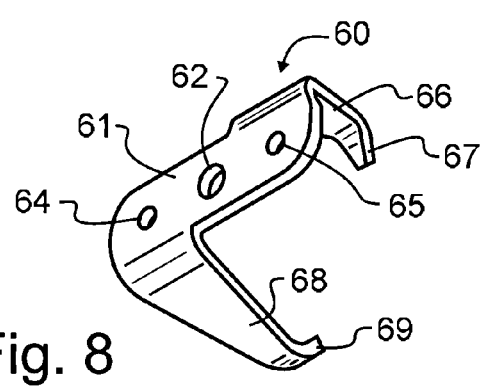
FIGS. 8-10 illustrates a preferred embodiment weed-out tool from projected, end, and side elevational view, respectively.
Figure 9:
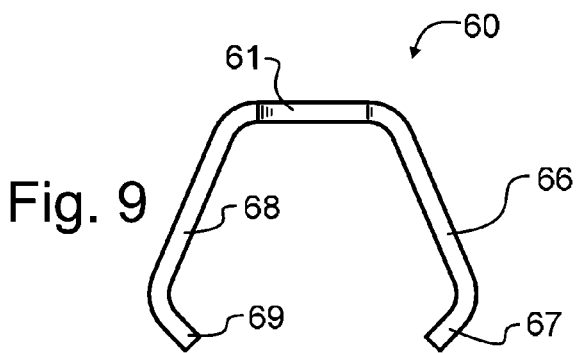
Figure 10:
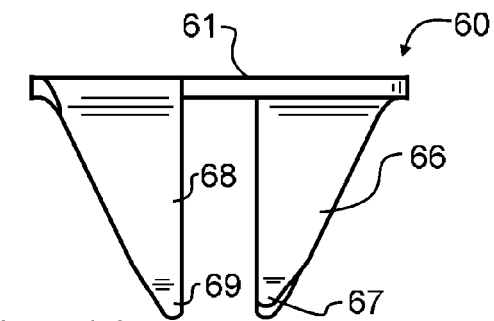

FIGS. 8-10 illustrate a preferred embodiment weed-out tool 60 that is particularly useful for removing dandelions and other weeds. Weed out tool 60 has a generally planar body 61 with a centering hole 62 formed therein, and two coupling holes 64, 65 on opposed sides of centering hole 62. Centering hole 62 and the two coupling holes 64, 65 are configured to align with holes 14, 15 and stabilizer tip 11, thereby allowing weed-out tool 60 to directly replace till plate 30 if so desired. A pair of teeth 66, 68 depend from opposed ends of the generally planar body and spread apart from each other with increasing distance from body 61. Each one of the pair of teeth 66, 68 terminate in a tip 67, 69, respectively. Each tip 67, 69 is angled back toward the other, and so decreases in distance from the other tooth with increasing distance from body 61. As visible in the end view of FIG. 9, this means that the tips 67, 69 tend to lift the soil and roots extending from the weed. This lifting by the tips 67, 69 severs the weed roots in the process. If the weed is shorter than the combined height of tooth 66 and tooth tip 67, then the weed top will not be damaged, while the roots will be lifted, thereby pulling the weed from the soil. For weeds having longer roots, such as a tap root, if the soil is sufficiently soft, the tap root may be lifted and pulled with the upper roots. However, if the soil is harder or more dense, the longer root may instead sever. If the root severs, weed-out tool 60 will still remove the critical upper portion. A designer may then determine a preferred length for each of the teeth 66, 68 and tooth tips 67, 69 to accommodate larger or smaller weeds, and to also permit shallower or deeper extraction. Teeth 66, 68 are gently tapered along the outer edge, as visible in FIG. 10, and as a result the small hole produced by weed-out tool 60 will be conical in shape.

As with till plate 30, weed-out tool 60 will provide some degree of autonomous depth control. When weed-out tool 60 is first brought into contact with the soil, tooth tips 67 and 69 which are angled similar to teeth 32-34 and 36-38 will bite into the soil, pulling weed-out tool 60 into the soil. However, as the depth increases, teeth 66, 68 will progressively apply more upward force, slowing the entry into the soil more as the weed-out tool digs more deeply in. This is due to the angular orientation of teeth 66, 68 as visible in FIG. 9 and described herein above, with teeth 66, 68 spread apart more from each other with increasing distance from body 61. This tilt causes these teeth to push downward against the soil they contact, while the tooth tips 67 and 69 push upward.

In addition, each one of teeth 66, 68 are displaced from being directly transverse to the central axis of rotation defined by centering hole 62. Using the orientation of FIG. 8, it can be seen that tooth 66 is shifted to the right from being centered above centering hole 62, while tooth 68 is shifted by an equal amount and in an opposite direction, to the left from being centered below centering hole 62. This means that as teeth 66, 68 rotate, there is some compression of soil away from the hole perimeter and towards centering hole 62 creating a small gap between the weed-bearing conical plug of soil and the surrounding earth. The weed tends to remove cleanly as a conical plug in more coherent soil, and as noted above, leaves behind a generally conical depression.

Figure 11:
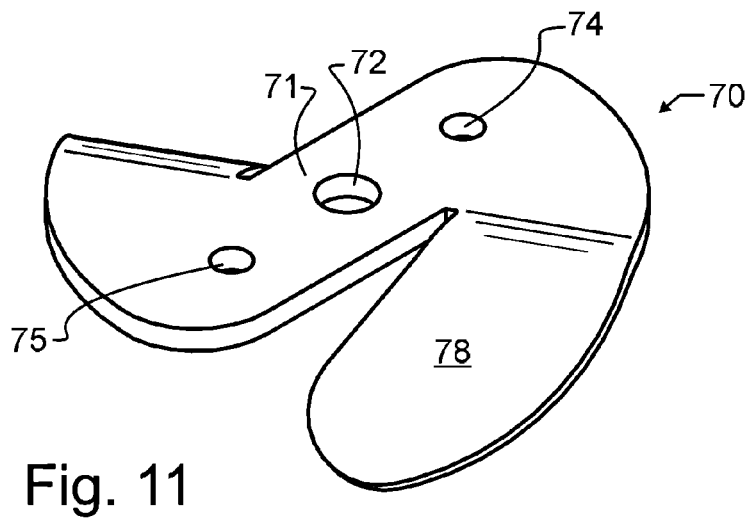
FIGS. 11-13 illustrate a preferred embodiment hole attachment from a top projected view, bottom projected view, and side view, respectively.
Figure 12:
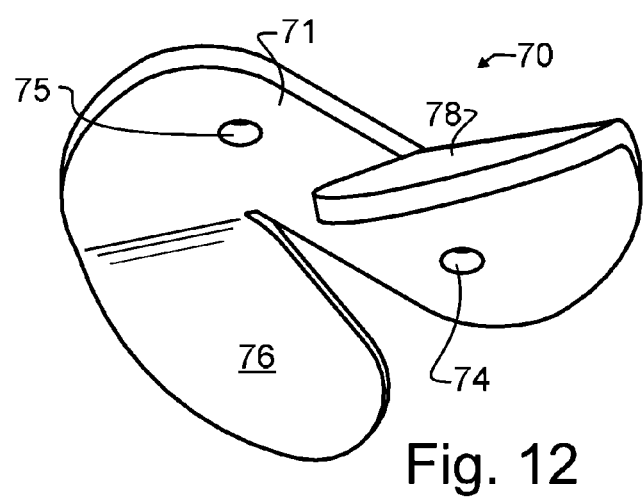
Figure 13:
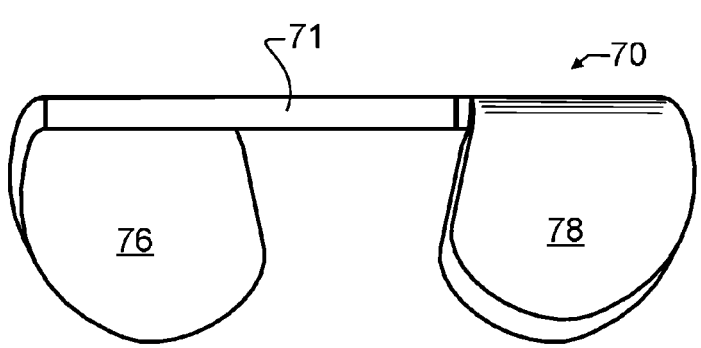

FIGS. 11-13 illustrate a preferred embodiment hole tool 70. As with till plate 30 and weed-out tool 60, three holes are provided for coupling with coupling plates 13,16: centering hole 72 formed through body 71; and two coupling holes 74, 75 on opposed sides of centering hole 72. Drill blades 76, 78 extend from distal ends of body 71, and are angled to bore into the earth. While body 71 will provide some resistance during a boring operation, body 71 has been dimensioned to provide minimal drag during boring, and instead hole tool 70 is designed so that drill blades 76, 78 primarily lift the earth up and above body 71. In a manner similar to till plate 30, the outer perimeter of hole tool 70 is generally circular and rounded, with the intentional avoidance of sharp corners and edges. Again as with till plate 30, this helps improve the safety of hole tool 70, reducing the chance of harm or injury to a tool operator.

From the foregoing figures and description, several additional features and options become more apparent. First of all, preferred embodiment drill attachment 1 may be manufactured from a variety of materials, including metals, alloys, resins and plastics, ceramics or cementitious materials, or even combinations or composites of the above. Nevertheless, preferred embodiment drill attachment 1 will preferably be sufficiently tough and durable to not fracture, even when great forces are applied thereto. Additionally, preferred embodiment drill attachment 1 will preferably also withstand repeated uses through a long time period without undue or unreasonable wear or erosion. Consequently, a preferred material is ordinary carbon steel, which has the advantages of being relatively low cost, easily worked, and sufficiently strong and durable to withstand forces that might commonly be encountered in working the soil in the manner preferred embodiment drill attachment 1 has been designed for.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:
1. A drill attachment for tilling soil, comprising:
   a shaft defining a longitudinal axis of rotation longitudinally terminating at a first end at a shank adapted to operatively couple to a rotary power source and longitudinally terminating at a second end distal to said first end at a stabilizer tip; and
   a till plate rigidly affixed to said drill shaft;
   said till plate having:
      a generally planar body member defining a first major surface configured to face said soil and a second major surface distal thereto;
      at least one perforation open and extending entirely from said generally planar body member first major surface to said generally planar body member second major surface; and
      at least one tooth protruding from said generally planar body member first major surface more distal from said shank than said generally planar body member and configured to operatively extend into said soil;

wherein said till plate is affixed to said shaft between said stabilizer tip and said shank, said stabilizer tip extending longitudinally distal to said first shaft end farther than said till plate and configured to resist sudden transverse movements of said till plate during operation and further configured to accurately position said till plate.

2. The drill attachment for tilling soil of claim 1, wherein said at least one tooth further comprises a plurality of teeth, and at least one tooth of said plurality of teeth is unitary with and formed from a portion of said generally planar body member.

3. The drill attachment for tilling soil of claim 2, wherein at least one tooth of said plurality of teeth is angularly offset from parallel to a plane defined by said generally planar body member and is angularly offset from perpendicular to said plane.

4. The drill attachment for tilling soil of claim 3, wherein said at least one angularly offset tooth is angularly offset intermediate between parallel and perpendicular to a plane defined by said generally planar body member.

5. The drill attachment for tilling soil of claim 2, wherein individual ones of said plurality of teeth are located at at least two different radial distances from said shaft.

6. The drill attachment for tilling soil of claim 5, wherein said plurality of teeth further comprise a plurality of pairs of opposed teeth, each one of said pair of opposed teeth having a first tooth and a second tooth, said second tooth located on an opposite side of said shaft from said first tooth, and said first and second teeth spaced a same distance from said shaft.

7. The drill attachment for tilling soil of claim 1, wherein said rotary power source further comprises a cordless drill configured to provide rotary motive power operative to turn said shaft.

8. The rotary till plate of claim 3, wherein said at least one angularly offset tooth is configured to generate a digging force tending to dig into said soil when rotated about said shaft, and said generally planar body member is configured to generate a force counter to said digging force when said generally planar body member engages with said soil, and said generally planar body member and said at least one angularly offset tooth are configured so that said digging force and said counter force are approximately equal and opposed.

9. The rotary till plate of claim 3, wherein said at least one angularly offset tooth further comprises a length terminating at a first end adjacent said generally planar body member and terminating at a second end distal thereto, and a major surface extensive along said length configured to contact and move said soil during rotation, said major surface twisted about said length from generally parallel with said generally planar body member first major surface adjacent to said generally planar body member to facing in a more outward radial direction distal thereto.

10. A rotary till plate, comprising:
a generally planar body member defining a first major surface adapted to operatively face soil and a second major surface distal thereto and having a center of rotation about which said generally planar body member is configured to operatively rotate;

at least one perforation open and extending entirely from said generally planar body member first major surface to said generally planar body member second major surface; and at least one tooth protruding from said generally planar body member first major surface adjacent to said at least one perforation and extending longitudinally therefrom and configured to operatively extend into said soil;

wherein said at least one tooth is unitary with said generally planar body member and further comprises matter displaced from a plane defined by said generally planar body member;

wherein at least one tooth is angularly offset from said generally planar body member at an angle intermediate between parallel and perpendicular to a plane defined by said generally planar body member; and wherein said at least one angularly offset tooth further comprises a length terminating at a first end adjacent said generally planar body member and terminating at a second end distal thereto, and a major surface extensive along said length, said major surface twisted about said length from generally parallel with said generally planar body member first major surface adjacent to said generally planar body member to facing in a more outward radial direction distal thereto.

11. The rotary till plate of claim 10, wherein said at least one tooth further comprises a plurality of teeth.

12. The rotary till plate of claim 11, wherein said plurality of teeth further comprise a plurality of pairs of opposed teeth, each one of said pair of opposed teeth having a first tooth and a second tooth, said second tooth located on an opposite side of said center of rotation from said first tooth, and said first and second teeth spaced a like distance from said center of rotation, and wherein each one of said plurality of pairs of opposed teeth has each of said first and second teeth spaced from said center of rotation by a different and unique distance than each other of said plurality of pairs of opposed teeth.

13. The rotary till plate of claim 10, wherein said generally planar body member has a generally circular perimeter.

14. A rotary weed out tool, comprising:
a generally planar body having a center of rotation about which said generally planar body is configured to operatively rotate;
a pair of teeth spaced from each other and depending from said generally planar body and spread apart from each other with increasing distance from said body;
a first tooth tip depending from a first one of said pair of teeth;
a second tooth tip depending from a second one of said pair of teeth;
said first tooth tip decreasing in distance from said second tooth tip with increasing distance from said body;
wherein each one of said pair of teeth are displaced by an equal amount and in an opposite direction from being directly transverse to said center of rotation.

15. The rotary weed out tool of claim 14, wherein each one of said pair of teeth is longer than both of said first and second tooth tips.

* * * * *